United States Patent [19]

Hoerauf et al.

[11] 4,233,429

[45] Nov. 11, 1980

[54] PROCESS FOR REMOVING VOLATILES EVOLVED FROM PLASTIC MELTS

[75] Inventors: Werner Hoerauf; Guenter Valentin, both of Ludwigshafen; Robert Kegel, Frankenthal; Helmut Kuhn, Gruenstadt, all of Fed. Rep. of Germany

[73] Assignee: BASF Aktiengesellschaft, Fed. Rep. of Germany

[21] Appl. No.: 927,848

[22] Filed: Jul. 25, 1978

[30] Foreign Application Priority Data

Aug. 3, 1977 [DE] Fed. Rep. of Germany ....... 2734946

[51] Int. Cl.$^3$ ............................................. C08G 69/14
[52] U.S. Cl. ..................................... 526/71; 528/323; 528/335; 528/503
[58] Field of Search ................. 526/71; 528/323, 335, 528/503

[56] References Cited

U.S. PATENT DOCUMENTS

| 2,987,506 | 6/1961 | Lum | 528/335 |
| 3,109,831 | 11/1963 | Seiner | 528/272 |
| 3,130,180 | 4/1964 | Wiloth | 528/335 |
| 3,376,353 | 4/1968 | Tate | 528/272 |
| 3,418,286 | 12/1968 | Schmidt et al. | 528/272 |
| 4,043,968 | 8/1977 | Spencer et al. | 526/71 |

*Primary Examiner*—Harold D. Anderson
*Attorney, Agent, or Firm*—Keil & Witherspoon

[57] ABSTRACT

A process for removing volatile constituents which are evolved from plastic melts when extruding the latter and are drawn off together with the surrounding air. The volatile constituents are drawn off immediately as they are evolved by the plastic melt and the air containing such volatile constituents is heated immediately after entering the suction orifice, and an apparatus for carrying out this process.

4 Claims, 1 Drawing Figure

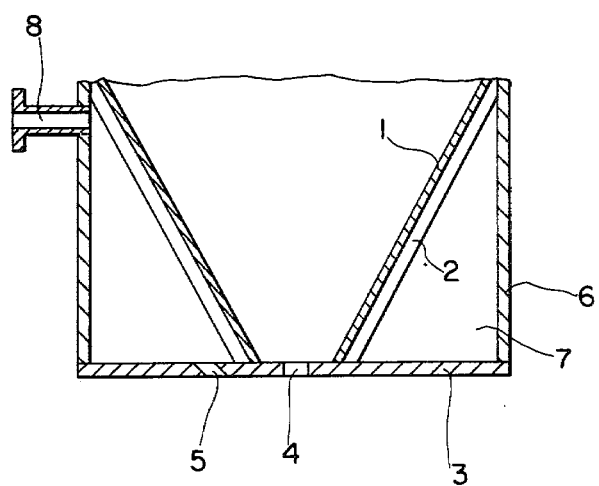

PROCESS FOR REMOVING VOLATILES EVOLVED FROM PLASTIC MELTS

When extruding plastic melts, during the manufacture or the processing of the plastic, volatile constituents are evolved from the plastic after it leaves the die orifice and these must be removed. Such volatile constituents are in some cases malodorous and irritate the respiratory tracts, and may be harmful on prolonged exposure thereto. For example, the extrusion of polycaprolactam generates caprolactam vapors which must be removed since caprolactam has a maximum allowable concentration (MAC value) of 25 mg/m$^3$. Such volatile constituents, which consist of monomers and oligomers or degradation products of polymers and may be solid or liquid at room temperature frequently deposit, when drawn off, in the pipelines and equipment provided for this purpose. This causes problems, the elimination of which requires substantial time and expense.

It is an object of the present invention to provide a method of removing volatile constituents which are evolved from plastic melts when extruding the latter, which avoids the formation of such deposits.

We have found that this object is achieved by a process for removing volatile constituents which are evolved from plastic melts when extruding the latter, by drawing off the volatile constituents together with the surrounding air, wherein the volatile constituents are drawn off immediately as they are evolved by the plastic melt and the air containing such volatile constituents is heated immediately after entering the suction orifice.

The invention further relates to an apparatus for drawing off volatile constituents which are evolved from plastic melts when extruding the latter, which comprises a conical inlet (1) for the plastic melt, with a heating jacket (2), a die plate (3), located at the tip of the cone, having at least one die orifice (4) through which the plastic melt issues, and at least one suction orifice (5), the outer casing (6) together with the heating jacket (2) and the die plate (3) forming a heated cavity (7) which possesses an outlet (8).

The novel process and the novel apparatus have the advantage that no blockages occur in the suction lines and that the harmful vapors are effectively removed from the working area. They have the further advantage that the air drawn off is heated to the desired temperature, immediately after it is drawn into the cavity, by means of the heating media for the die plate and plastic melt, without any auxiliary means.

The process according to the invention may be used for removing volatile constituents which are evolved from plastic melts during extrusion. As a rule, the plastics are organic thermoplastic polymers, for example polystyrene, styrene copolymers, eg. with acrylonitrile, or rubber-modified polystyrenes, as well as polyvinyl chloride, rubber-modified polyvinyl chloride, polyolefins, eg. polyethylene or polypropylene, polyoxymethylene and nylons, eg. nylon-6,6 or nylon-6.

Such polymers are molded in the form of their melt, for example at from 180° to 300° C. The nature and composition of the volatile constituents evolved from the melt during molding are only partially known. Such volatile constituents contain monomers, as well as oligomers originating from the polymerization or oligomers resulting from thermal degradation, as well as decomposition products. The process may be used particularly advantageously if the volatile constituents are liquid or solid at room temperature. The process of the invention has attained particular industrial importance for the extrusion of polycaprolactam. In this case, the caprolactam vapors formed during extrusion are removed.

For the purposes of the invention, extrusion means both the discharge of a plastic melt during its manufacture, and the molding of a plastic melt during further processing, for example to form continuous profiles, such as pipes.

The volatile constituents are drawn off with the surrounding air, immediately they are evolved from the plastic melt. An essential characteristic of the invention is that the air containing such volatile constituents is heated immediately after entering the suction orifice. The temperatures depend on the nature of the volatile constituents. As a rule, the air drawn off should be heated to at least 20° C., advantageously 30° C., above the melting point of the drawn-off volatile constituents. When drawing off caprolactam vapors, the drawn-off air is, for example, heated to at least 90° C. in order to avoid deposition of solid caprolactam. For other volatile constituents, the most advantageous temperatures can be determined relatively easily by simple experiments. The upper temperature limit is imposed by economic considerations. Excessive heating unnecessarily consumes energy. As a rule, 200° C. is to be regarded as the upper temperature limit. However, bearing in mind the diversity of possible volatile constituents, the stated value is not to be regarded as an absolute limit. It has proved particularly advantageous to heat the drawn-off air, containing the volatile constituents, by means of the heating medium for the plastic melt, for example the electrical heating or liquid heating used for heating the plastic melt.

When drawing off water-soluble vapors, eg. caprolactam vapors, it has proved advantageous to generate the suction by means of water pumps. In that case, the volatile constituents, eg. caprolactam, are washed out of the drawn-off air and accumulate in the water, which is recycled. In this way, the caprolactam drawn off is obtained as, for example, a 20 percent strength by weight solution, from which caprolactam is recovered.

The suction orifice is advantageously in the immediate vicinity of the die orifice from which the plastic melt issues, for example at a distance of from 3 to 10 cm therefrom, in order to ensure that the volatile constituents are removed immediately as they are evolved from the plastic melt. It has proved advantageous for the direction in which the vapors are drawn off not to be parallel to the direction in which the melt issues, but at an angle of, for example, from 25° to 60° C. to the axis of the melt, so that the volatile constituents are drawn away from the plastic melt.

FIG. 1 shows the cross-section of an apparatus suitable for carrying out the process. The FIGURE shows the discharge portion of an apparatus of any appropriate type, not specified in more detail, which contains plastic melt. The discharge portion consists of a conical feed 1 for the plastic melt. The cone need not taper to a point but instead can have any other shape of outlet, eg. oval or rectangular. The conical feed 1 is surrounded by a heating jacket 2. This is provided with electrical induction heating or vapor or liquid heating. A die plate 3 is attached to the lower end of the conical feed. This die plate has at least one outlet orifice for the plastic melt 4. The shape and number of orifices depends on the particular purpose for which the plastic melt is extruded. If the plastic is to be granulated, it is advantageous to provide a series of orifices in the form of die perforations, so as to obtain strands which can be granulated. If it is intended to manufacture continuous profiles, the orifices are designed in accordance with the dies known from the prior art. The die plate 3 in addition has at least one suction orifice 5. Through this suction orifice, the volatile constituents which are evolved when the plastic melt issues from the die orifice 4 are drawn off immediately. It has proved advantageous to have the suction orifice 5 as close as possible to the die orifice 4. Further, it has proved advantageous to have the suction orifice 5 inclined to the die orifice 4 in the direction of the issuing stream of plastic. The outer casing 6, which has an outlet 8, together with the heating jacket 2 and the die plate 3 forms a heated cavity 7. When the drawn-off air enters the cavity 7 through the suction orifice 5, it is heated by the heating jacket 2 and leaves the cavity via the outlet 8, to pass to a suction apparatus which is not shown. It is also possible to provide suction orifices 5 on both sides of the die orifice 4. The suction orifice 5 can also be in the form of several suction orifices or slits or annular slits, matching the die orifice 4.

We claim:

1. In a process for removing volatile constituents which are evolved from a plastic melt when said melt is extruded from apparatus having means to melt said plastic through a heated extrusion die orifice and which escape into open air surrounding said extrusion die orifice, the improvement wherein the volatile constituents are drawn off immediately as they are evolved together with said air surrounding said extrusion die orifice through at least one suction orifice located in the immediate neighborhood of said die orifice and wherein the air drawn off and the volatile constituents therein are heated immediately after entering said suction orifice by the means used to melt said plastic melt.

2. A process as claimed in claim 1, wherein the drawn-off air is heated to a temperature at least 20° C. above the melting point of the volatile constituents.

3. A process as claimed in claim 1, wherein the suction orifice is inclined to the plastic melt issuing from the die orifice.

4. A process as claimed in claim 1, wherein caprolactam vapors formed during the extrusion of polycaprolactam are removed.

* * * * *